(12) United States Patent
Gaal et al.

(10) Patent No.: US 9,008,024 B2
(45) Date of Patent: Apr. 14, 2015

(54) METHOD AND APPARATUS FOR MAPPING VIRTUAL RESOURCES TO PHYSICAL RESOURCES IN A WIRELESS COMMUNICATION SYSTEM

(71) Applicant: QUALCOMM Incorporated, San Diego, CA (US)

(72) Inventors: Peter Gaal, San Diego, CA (US); Juan Montojo, Nuremberg (DE)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 13/948,021

(22) Filed: Jul. 22, 2013

(65) Prior Publication Data

US 2013/0301593 A1 Nov. 14, 2013

Related U.S. Application Data

(63) Continuation of application No. 12/400,767, filed on Mar. 9, 2009, now Pat. No. 8,493,835.

(60) Provisional application No. 61/072,034, filed on Mar. 26, 2008.

(51) Int. Cl.
*H04W 72/04* (2009.01)
*H04L 5/02* (2006.01)
(Continued)

(52) U.S. Cl.
CPC ............. *H04W 72/04* (2013.01); *H04L 5/023* (2013.01); *H04L 27/2601* (2013.01); *H04L 5/0007* (2013.01); *H04L 5/0053* (2013.01)

(58) Field of Classification Search
CPC ..... H04W 72/04; H04L 5/023; H04L 5/0053; H04L 27/2601
USPC .......................... 370/203, 208, 319, 329, 344
See application file for complete search history.

(56) References Cited

U.S. PATENT DOCUMENTS 5,909,471 A 6/1999 Yun
6,493,331 B1 12/2002 Walton et al.
(Continued)

FOREIGN PATENT DOCUMENTS

CN 1387712 A 12/2002
EP 1282258 A1 2/2003
(Continued)

OTHER PUBLICATIONS

LG Electronics: "DL control signaling for DVRB allocation using compact assignment",3GPP TSG RAN WG1 #52, R1-081007, Feb. 15, 2008.
(Continued)

*Primary Examiner* — Paul H Masur
(74) *Attorney, Agent, or Firm* — Anthony R. Morris

(57) ABSTRACT

Techniques for mapping virtual resources to physical resources in a wireless communication system are described. In an aspect, a virtual resource (e.g., a virtual resource block) may be mapped to a physical resource in a selected subset of physical resources based on a first mapping function, which may map contiguous virtual resources to non-contiguous physical resources in the selected subset. The physical resource in the selected subset may then be mapped to an allocated physical resource (e.g., a physical resource block) among a plurality of available physical resources based on a second mapping function. In one design, the first mapping function may include (i) a re-mapping function that maps an index of the virtual resource to a temporary index and (ii) a permutation function (e.g., a bit-reversed row-column interleaver) that maps the temporary index to an index of the physical resource in the selected subset.

16 Claims, 7 Drawing Sheets

(51) Int. Cl.
*H04L 27/26* (2006.01)
*H04L 5/00* (2006.01)

(56) References Cited

U.S. PATENT DOCUMENTS

| | | | |
|---|---|---|---|
| 6,952,454 | B1 | 10/2005 | Jalali et al. |
| 8,493,835 | B2 | 7/2013 | Gaal et al. |
| 2003/0081538 | A1 | 5/2003 | Walton et al. |
| 2007/0258532 | A1 | 11/2007 | Bai et al. |
| 2008/0192847 | A1 | 8/2008 | Classon et al. |
| 2008/0212514 | A1 | 9/2008 | Chen |
| 2009/0175230 | A1 | 7/2009 | Callard et al. |
| 2009/0175231 | A1 | 7/2009 | Seo et al. |
| 2009/0310475 | A1 | 12/2009 | Seo et al. |
| 2011/0051672 | A1 | 3/2011 | Lee et al. |

FOREIGN PATENT DOCUMENTS

| | | |
|---|---|---|
| JP | 2009239340 A | 10/2009 |
| JP | 2011507331 A | 3/2011 |
| RU | 2290764 C2 | 12/2006 |
| RU | 2314643 C2 | 1/2008 |
| TW | 512602 B | 12/2002 |
| TW | 548927 B | 8/2003 |
| TW | I223517 B | 11/2004 |
| WO | 2004114548 A1 | 12/2004 |
| WO | 2005006597 A1 | 1/2005 |
| WO | 2007082754 A1 | 7/2007 |
| WO | 2007094628 A1 | 8/2007 |
| WO | 2008000116 A1 | 1/2008 |
| WO | 2009088202 A2 | 7/2009 |

OTHER PUBLICATIONS

International Search Report & Written Opinion—PCT/US2009/038345, International Search Authority—European Patent Office—Aug. 25, 2009.

Mitsubishi Electric: "Mapping Detail of the Distributed Allocation" 3GPP Draft; R1-081184_VRBT0PRB, 3rd Generation Partnership Project (3GPP), Mobile Competence Centre ; 650, Route Des Lucioles ; F-06921 Sophia-Antipolis Cedex; France, vol. RAN WG1, no. Shenzhen, China; Mar. 31, 2008, Mar. 26, 2008, XP050109631 the whole document.

Motorola: "E-UTRA DL Distributed Multiplexing and Mapping Rules: Performance" 3GPP Draft; R1-073392_Disttrans Athens, 3rd Generation Partnership Project (3GPP), Mobile Competence Centre; 650, Route Des Lucioles ; F-06921 Sophia-Antipolis Cedex ; France, vol. RAN WG1, no. Athens, Greece; Aug. 20, 2007, Aug. 14, 2007, XP050107014 chapter 2. Value of Nd and Mapping Function; Annex A; figure 1.

NEC Group: "Cell-specific Mapping of VRBs to PRBs for Downlink Distributed Transmission" 3GPP Draft; R1-074154, 3rd Generation Partnership Project (3GPP), Mobile Competence Centre ; 650, Route Des Lucioles ; F-06921 Sophia-Antipolis Cedex ; France, vol. RAN WG1, no. Shanghai, China; Oct. 8, 2007, Oct. 2, 2007, XP050107686 the whole document.

NEC Group: "DL Distributed Resource Block Mapping for inter-cell interference randomization", 3GPP TSG RAN WG1 Meeting #49bis R1-072827, Jun. 2007, pp. 1-5.

NEC Group: "Remaining issues for DVRB to PRB mapping" 3GPP Draft; R1-081398-DVRB to PRB Mapping, 3rd Generation Partnership Project (3GPP), Mobile Competence Centre ; 650, Route Des Lucioles ; F-06921 Sophia-Antipolis Cedex ; France, v o l . RAN WG1, no. Shenzhen, China; Mar. 31, 2008, Mar. 25, 2008, XP050109815 chapter 2. DVRB to PRB mapping.

NEC Group: "Remaining issues for DVRB toPRB mapping" 3GPP Draft; R1-081021-DVRB to PRB Mapping, 3rd Generation Partnership Project (3GPP), Mobile Competence Centre ; 650, Route Des Lucioles ; F-06921 Sophia-Antipolis Cedex ; France, vol. RAN WG1, no. Sorrento, I t a l y; Feb. 11, 2008, Feb. 5, 2008, XP050109484 chapter 2. DVRB to PRB mapping.

Panasonic: "DL DVRB to PRB mapping" 3GPP Draft; R1-080137, 3rd Generation Partnership Project (36PP), Mobile Competence Centre ; 650, Route Des Lucioles ; F-06921 Sophia-Antipolis Cedex; France, vol. RAN WG1, no. Sevilla, Spain; Jan. 14, 2008, Jan. 9, 2008, XP050108668 the whole document.

QUALCOMM Europe: "Further details on DL distributed transmissions" 3GPP Draft; R1-081491, 3rd Generation Partnership Project (3GPP), Mobile Competence Centre ; 650, Route Des Lucioles ; F-06921 Sophia-Antipolis Cedex ; France, vol. RAN WG1, no. Shenzhen, China; Mar. 31, 2008, Mar. 26, 2008, XP050109907 the whole document.

Taiwan Search Report—TW098109770—TIPO—Oct. 7, 2012.

ZTE: "DVRB to PRB Mapping" 3GPP Draft; R1-081412 DVRB to PRB Mapping, 3rd Generation Partnership Project (3GPP), Mobile Competence Centre ; 650, Route Des Lucioles ; F-06921 Sophia-Antipolis Cedex ; France, vol. RAN WG1, no. Shenzhen, China; Mar. 31, 2008, Mar. 26, 2008, XP050109829 the whole document.

METHOD AND APPARATUS FOR MAPPING VIRTUAL RESOURCES TO PHYSICAL RESOURCES IN A WIRELESS COMMUNICATION SYSTEM

The present application is a continuation of U.S. application Ser. No. 12/400,767, entitled METHOD AND APPARATUS FOR MAPPING VIRTUAL RESOURCES TO PHYSICAL RESOURCES IN A WIRELESS COMMUNICATION SYSTEM, filed Mar. 9, 2009, assigned U.S. Pat. No. 8,493,835 with an issue date of Jul. 23, 2013, which claims priority to provisional U.S. Application Ser. No. 61/072,034, entitled DOWNLINK DISTRIBUTED TRANSMISSIONS AND OTHER MATTERS, filed Mar. 26, 2008, both assigned to the assignee hereof and incorporated herein by reference.

BACKGROUND

I. Field

The present disclosure relates generally to communication, and more specifically to techniques for determining allocated resources in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may allocate resources to a UE for data transmission on the downlink and/or uplink. It may be desirable to allocate resources such that diversity can be achieved to obtain good performance while reducing signaling overhead to convey the allocated resources.

SUMMARY

Techniques for mapping virtual resources to physical resources in a wireless communication system are described herein. Virtual resources in a virtual domain may be allocated to UEs and may be mapped to physical resources usable for communication. In one design, the virtual resources may comprise virtual resource blocks (VRBs), and the physical resources may comprise physical resource blocks (PRBs).

In an aspect, a virtual resource (e.g., a VRB) may be mapped to a physical resource in a selected subset of physical resources based on a first mapping function. The first mapping function may map contiguous virtual resources to non-contiguous physical resources in the selected subset to achieve diversity as well as other desirable characteristics. The physical resource in the selected subset may then be mapped to an allocated physical resource (e.g., a PRB) among a plurality of available physical resources based on a second mapping function.

In one design of the first mapping function, an index of the virtual resource may be mapped to a temporary index based on a re-mapping function. The temporary index may then be mapped to an index of the physical resource in the selected subset based on a permutation function. The re-mapping function may be defined to (i) map an input index to two different output indices in two slots to achieve second order diversity when one virtual resource is allocated and (ii) map two consecutive input indices to four different output indices in two slots to achieve fourth order diversity when two virtual resources are allocated. The re-mapping function may also be defined to support efficient allocation of resources, as described below. In one design, the permutation function may map consecutive input indices to permuted output indices to achieve diversity. The permutation function may comprise a bit-reversed row-column interleaver or some other function.

The selected subset may be one of multiple subsets of physical resources formed with the plurality of available physical resources. The second mapping function may be applicable for the selected subset. Different second mapping functions may be used for different subsets of physical resources.

Various aspects and features of the disclosure are described in further detail below.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

Figure 1:
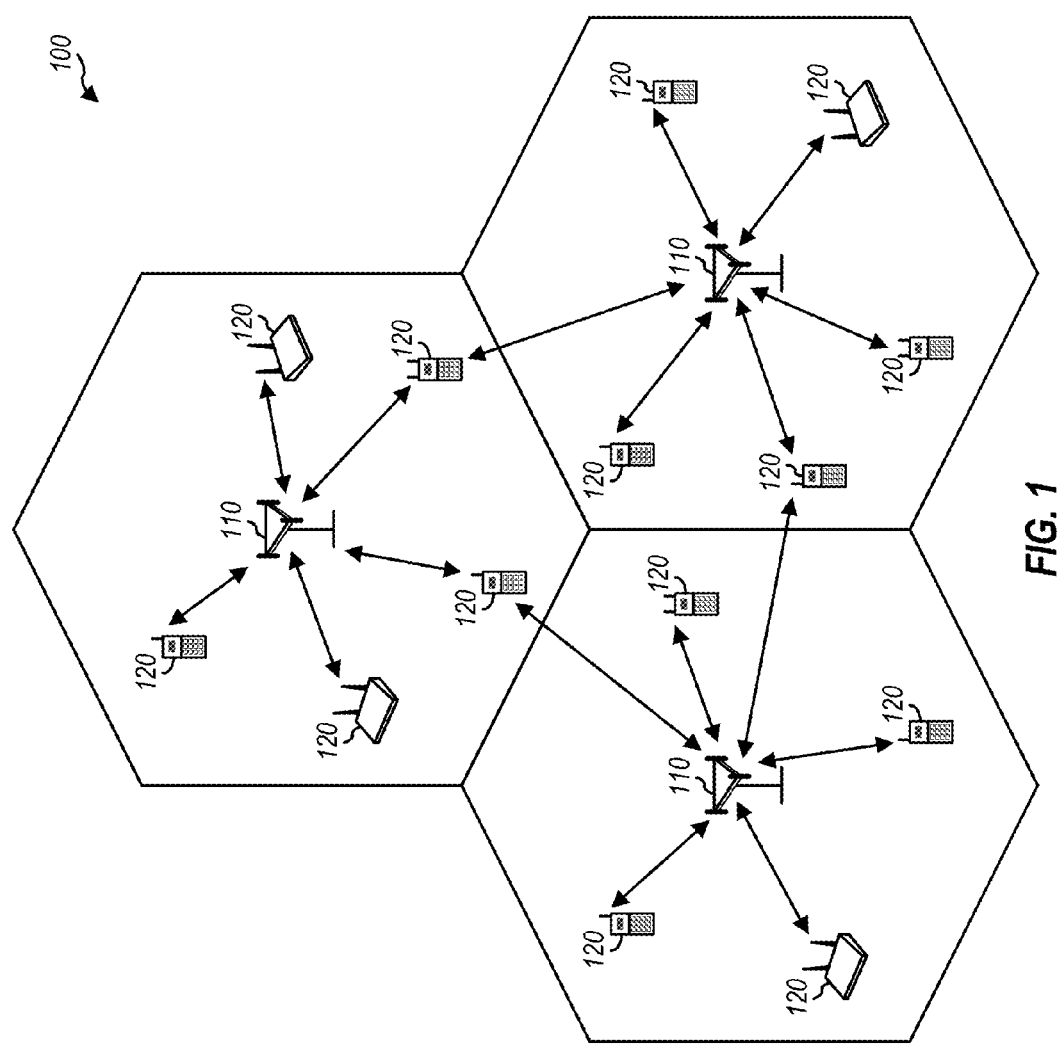
FIG. 1 shows a wireless communication system.

FIG. 1 shows a wireless communication system 100, which may be an LTE system. System 100 may include a number of evolved Node Bs (eNBs) 110 and other network entities. An eNB may be a station that communicates with the UEs and may also be referred to as a Node B, a base station, an access point, etc. Each eNB 110 provides communication coverage for a particular geographic area and supports communication for the UEs located within the coverage area. UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc.

LTE utilizes orthogonal frequency division multiplexing (OFDM) on the downlink and single-carrier frequency division multiplexing (SC-FDM) on the uplink. OFDM and SC-FDM partition the system bandwidth into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024 or 2048 for system bandwidth of 1.25, 2.5, 5, 10 or 20 MHz, respectively.

Figure 2:
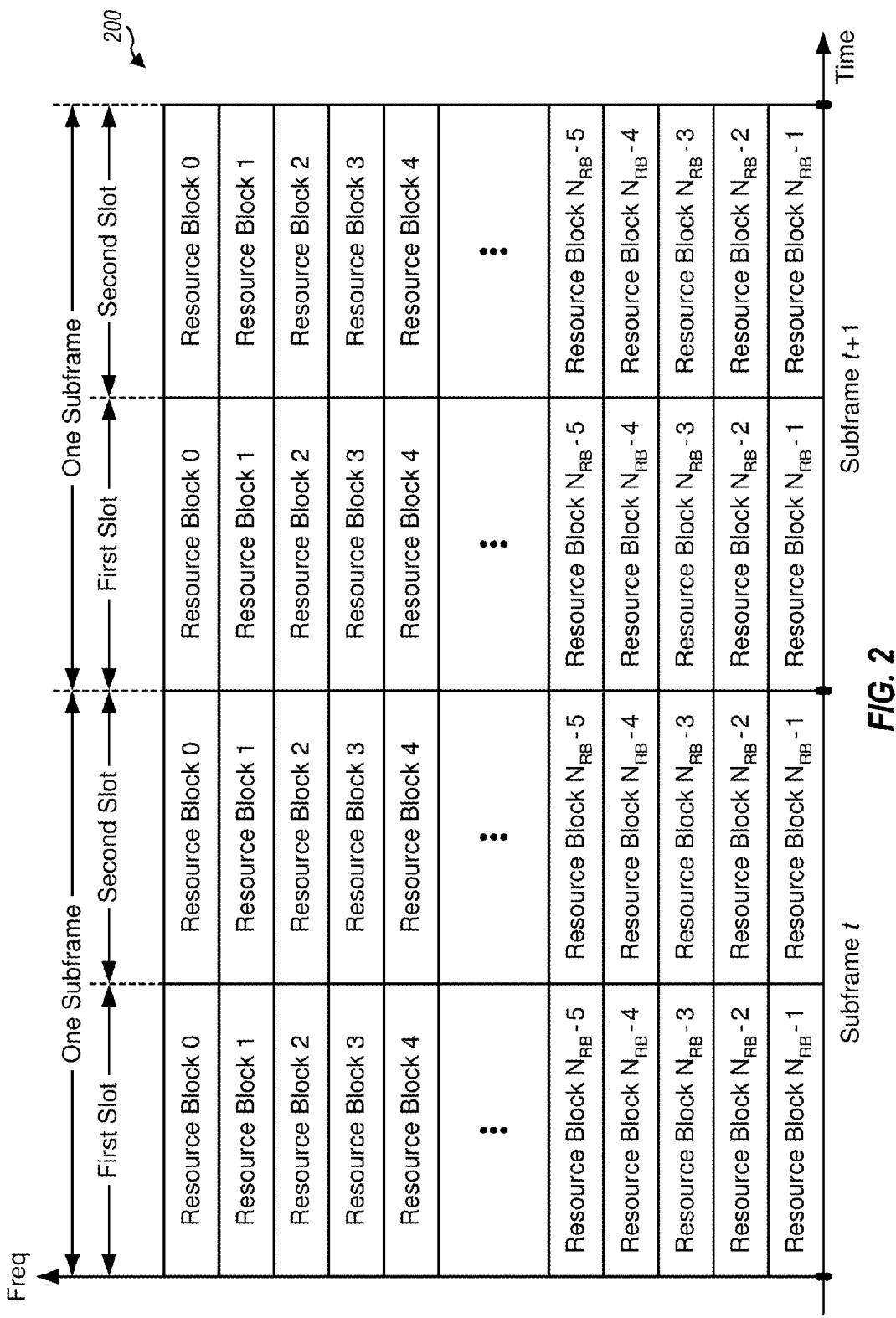
FIG. 2 shows an exemplary resource structure.

FIG. 2 shows a design of a resource structure 200 that may be used for the downlink or uplink. The transmission timeline may be partitioned into units of subframes. Each subframe may have a predetermined duration, e.g., one millisecond (ms). A subframe may be partitioned into two slots, which may include a first/left slot and a second/right slot. Each slot may include a fixed or configurable number of symbol periods, e.g., six symbol periods for an extended cyclic prefix or seven symbol periods for a normal cyclic prefix.

$N_{RB}$ resource blocks (RBs) with indices 0 to $N_{RB}-1$ may be defined in each slot with the $N_{FFT}$ total subcarriers. Each resource block may cover $N_{SC}$ subcarriers (e.g., $N_{SC}=12$ subcarriers) in one slot. The number of resource blocks in each slot may be dependent on the system bandwidth and may range from 6 to 110. The $N_{RB}$ resource blocks may also be referred to as physical resource blocks (PRBs).

Virtual resource blocks (VRBs) may also be defined to simplify the allocation of resources. A VRB may have the same dimension as a PRB and may cover $N_{SC}$ subcarriers in one slot in a virtual domain. A VRB may be mapped to a PRB based on a VRB-to-PRB mapping. VRBs may be allocated to the UEs, and transmissions for the UEs may be sent on PRBs to which the allocated VRBs are mapped.

A UE may be allocated any number of PRBs and any one of the available PRBs. The allocated PRB(s) may be conveyed with a bitmap comprising $N_{RB}$ bits, one bit for each available PRB. Each bitmap bit may be set to '1' to indicate an allocated PRB or to '0' to indicate an un-allocated PRB. However, a large bitmap would be required for a large system bandwidth with a large number of available PRBs.

To reduce signaling overhead for conveying the allocated resources, the available PRBs may be partitioned into resource block groups (RBGs). Each RBG may include up to P consecutive PRBs, where P may be dependent on the system bandwidth. Table 1 lists the value of P versus system bandwidth for one design.

TABLE 1

RBG Size Versus System Bandwidth

| System Bandwidth ($N_{RB}$) | RBG Size (P) |
|---|---|
| ≤10 | 1 |
| 11-26 | 2 |
| 27-63 | 3 |
| 63-110 | 4 |

$N_{RBG}$ RBGs may be defined with the $N_{RB}$ available PRBs, where $N_{RBG}$ may be given as:

$$N_{RBG}=\lceil N_{RB}/P \rceil, \qquad \text{Eq (1)}$$

where $\lceil x \rceil$ denotes a ceiling operator that provides the smallest integer value equal to or greater than x.

The $N_{RBG}$ RBGs may be divided into P RBG subsets with indices 0 to P−1. RBG subset p, for p=0, . . . , P−1, may include every P-th RBG starting with RBG p. The P RBG subsets may or may not include the same number of RBGs, depending on whether ($N_{RBG}$ mod P)=0. The P RBG subsets may or may not include the same number of PRBs, depending on the number of available PRBs and the value of P.

Figure 3A:
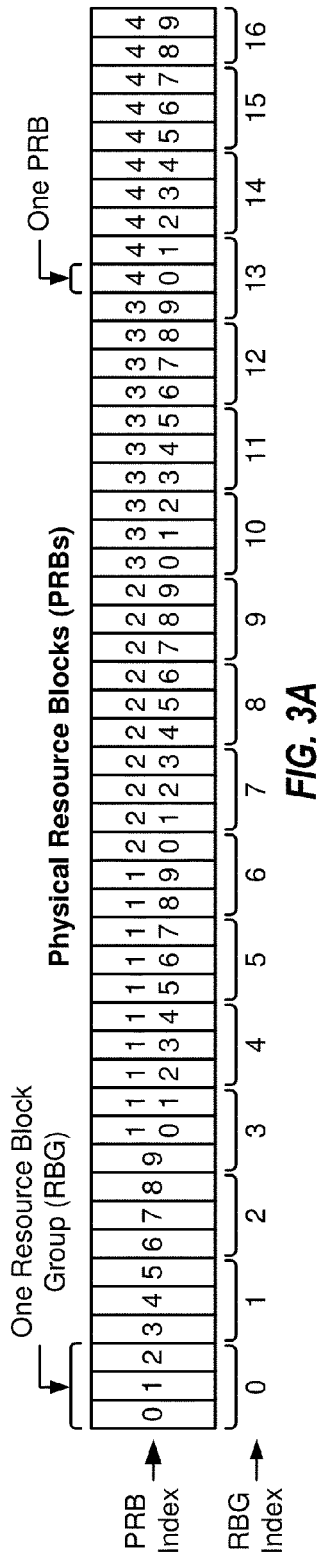
FIG. 3A shows an example of partitioning physical resources into groups.

FIG. 3A shows an example of partitioning the available PRBs into RBGs. In this example, 50 available PRBs with indices m=0 to 49 are partitioned into 17 RBGs with indices 0 to 16. PRB index m may also be referred to as $n_{RB}$. Each of the first 16 RBGs includes P=3 contiguous PRBs, and the last RBG includes two remaining PRBs.

Figure 3B:
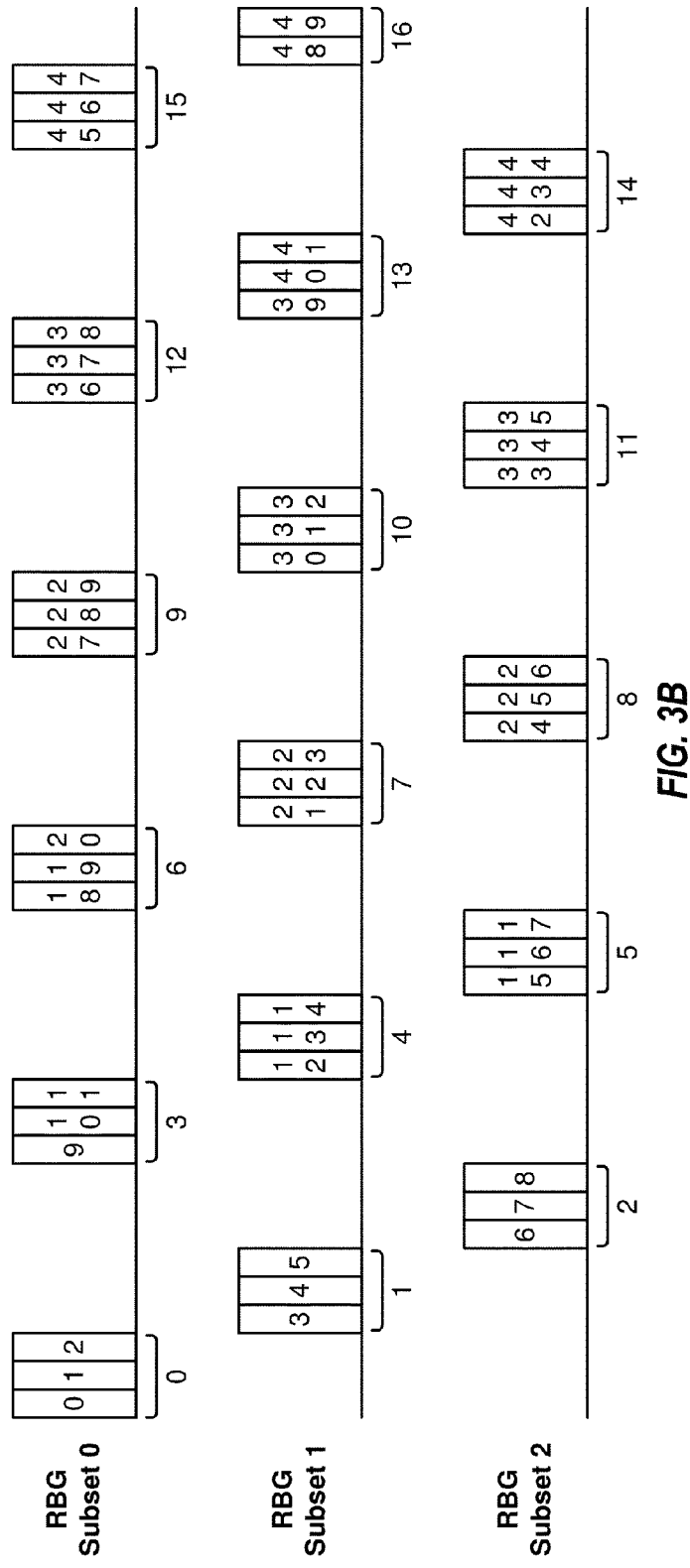
FIG. 3B shows an example of forming subsets of physical resources.

FIG. 3B shows an example of forming three RBG subsets with the 17 RBGs obtained with the 50 available PRBs. RBG subset 0 includes six RBGs with indices 0, 3, 6, 9, 12 and 15 and includes 18 PRBs with indices m=0, 1, 2, 9, 10, 11, 18, 19, 20, etc. RBG subset 1 includes six RBGs with indices 1, 4, 7, 10, 13 and 16 and includes 17 PRBs with indices m=3, 4, 5, 12, 13, 14, 21, 22, 23, etc. RBG subset 2 includes five RBGs with indices 2, 5, 8, 11 and 14 and includes 15 PRBs with indices m=6, 7, 8, 15, 16, 17, 24, 25, 26, etc.

The system may support multiple resource allocation types, which may include:
  Resource allocation type 0—allocate an integer number of RBGs,
  Resource allocation type 1—allocate PRBs within a select RBG subset, and
  Resource allocation type 2—allocate localized or distributed VRBs.

For resource allocation type 0, a UE may be allocated any one of the $N_{RBG}$ RBGs. Resource allocation information for the UE may include a bitmap comprising $N_{RBG}$ bits, one bit for each available RBG. Each bitmap bit may be set either to '1' to indicate an allocated RBG or to '0' to indicate an un-allocated RBG. The number of bitmap bits may be reduced by having one bitmap bit for each RBG (instead of each PRB). However, resources are allocated in coarse units of RBG (instead of fine units of PRB).

For resource allocation type 1, a UE may be allocated any of the PRBs in a selected RBG subset. Resource allocation information for the UE may include (i) an indication of the selected RBG subset and (ii) a bitmap for the PRBs in the selected RBG subset. The bitmap may indicate which PRBs are allocated to the UE.

For resource allocation type 2, a UE may be allocated a set of contiguous localized or distributed VRBs. A localized VRB with index $n_v$, may be mapped directly to a PRB with index $n_{PRB}$, so that $n_{PRB}=n_{VRB}$. A distributed VRB (DVRB) with index $n_{VRB}$ may be mapped to a PRB with index $n_{PRB}$ based on a known VRB-to-PRB mapping function M( ), so that $n_{PRB}=M(n_{VRB})$. Resource allocation information for the UE may include (i) an indication of whether localized or distributed VRBs are assigned, (ii) an index of the starting VRB allocated to the UE, and (iii) the number of contiguous VRBs allocated to the UE. The terms "contiguous" and "consecutive" may be used interchangeably.

In an aspect, a VRB-to-PRB mapping may be defined to support distributed VRBs for resource allocation type 2 while being compatible with resource allocation types 0 and 1. In particular, the VRB-to-PRB mapping may map contiguous VRBs to non-contiguous (i.e., permuted, interleaved, or distributed) PRBs within an RBG subset. Restricting the mapping to one RBG subset may allow other RBG subsets to be used for resource allocation type 0 and/or 1.

In one design, the VRB-to-PRB mapping may comprise (i) a first mapping function f( ) to map contiguous VRBs for one RBG subset to non-contiguous PRBs in the RBG subset and (ii) a second mapping function s( ) to map the PRBs in the RBG subset to all available PRBs. The first mapping function may be defined to support distributed VRBs within one RBG subset. The first mapping function may constrain the mapping of VRBs to PRBs within one RBG subset and may thus allow each RBG subset to be used for any resource allocation type.

In one design, to simplify the first mapping function, the PRBs in each RBG subset may be aggregated and assigned intermediate indices $k=0$ to $N_p-1$, where $N_p$ is the number of PRBs in RBG subset p. $N_p$ may have different values for different RBG subsets and may also be denoted as $N_{RB}^{RBG}$. The second mapping function may map intermediate indices k of the $N_p$ PRBs in RBG subset p to PRB indices m of the $N_{RB}$ available PRBs.

Figure 4:
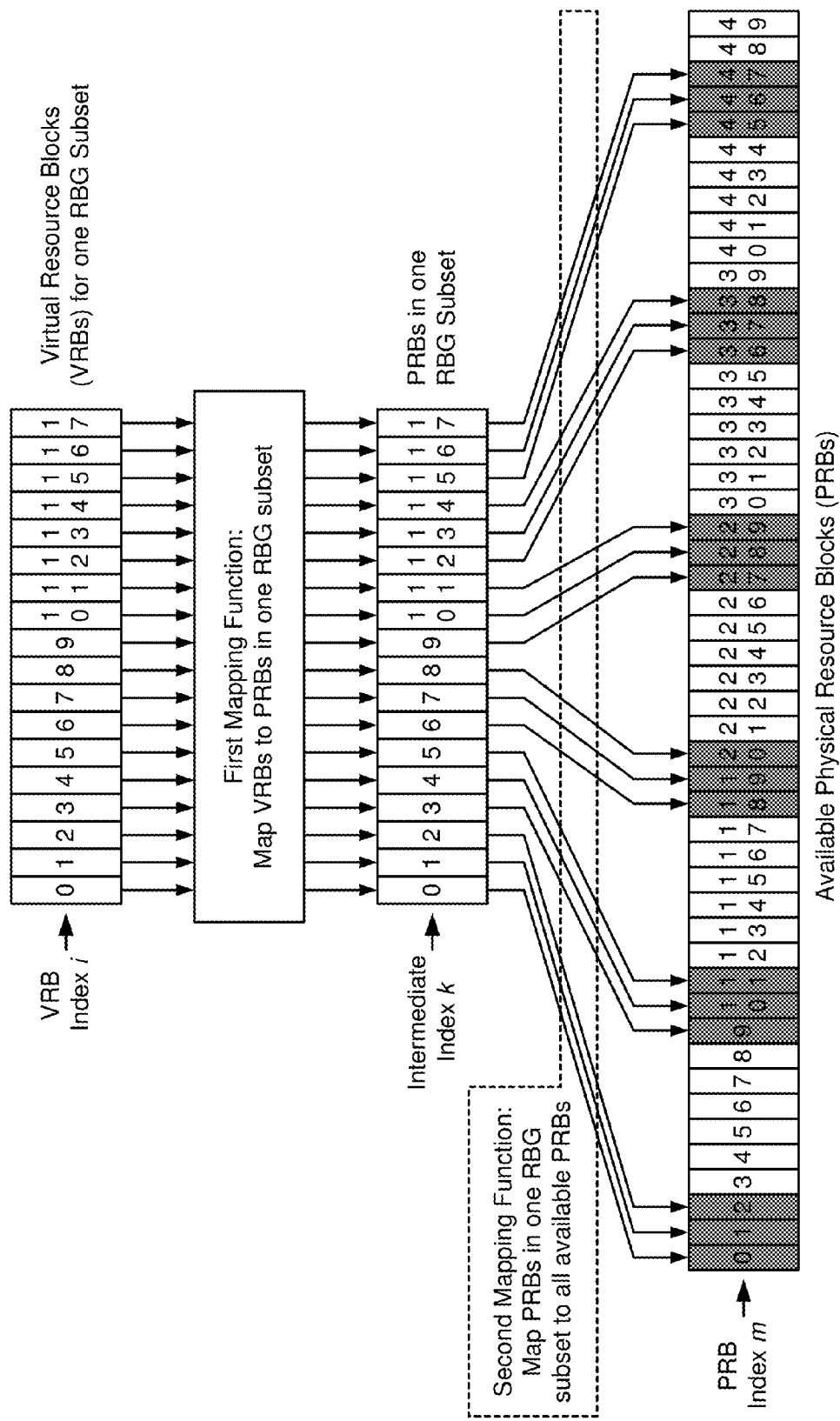
FIG. 4 shows an example of mapping a VRB index to a PRB index.

FIG. 4 shows an example of mapping VRBs for one RBG subset to available PRBs. In this example, 18 VRBs with indices $i=0$ to 17 may be defined for RBG subset 0. Also, 18 PRBs for RBG subset 0 may be aggregated and assigned intermediate indices $k=0$ to 17. The first mapping function may map the 18 VRBs to the 18 PRBs in RBG subset 0 and may be implemented as described below.

The second mapping function may map the 18 PRBs in RBG subset 0 to the 50 available PRBs. Intermediate indices $k=0$, 1 and 2 for the three PRBs in the first RBG may be mapped to PRB indices $m=0$, 1 and 2. Intermediate indices $k=3$, 4 and 5 for the three PRBs in the next RBG may be mapped to PRB indices $m=9$, 10 and 11. Intermediate indices for the remaining PRBs in RBG subset 0 may be mapped to PRB indices for the available PRBs as shown in FIG. 4. FIG. 4 shows an example of the second mapping function for RBG subset 0. Different second mapping functions may be defined for different RBG subsets. The second mapping functions for all P RBG subsets may be implemented in an efficient manner due to the structured manner in which the RBGs and the RBG subsets are defined.

In one design, the first mapping function may map contiguous VRBs for one RBG subset to non-contiguous PRBs in the RBG subset. In general, $N_p$ VRBs may be available for RBG subset p and may be assigned indices $i=0$ to $N_p-1$. VRB index i may also be referred to as $n_{VRB}$. $N_p$ PRBs may also be included in RBG subset p and may be assigned indices $k=0$ to $N_p-1$. The first mapping function f( ) may map VRB index i to intermediate index k, so that $k=f(i)$.

The first mapping function f( ) may be implemented in various manners. In one design, the first mapping function may comprise a re-mapping function r( ) and a permutation function σ( ). The re-mapping function may map input indices to output indices to obtain certain desired characteristics, as described below. The permutation function may map contiguous input indices to permuted output indices to achieve diversity. In one design that is described below, the re-mapping function may be followed by the permutation function. In this design, the re-mapping function may map VRB index i to a temporary index j, or $j=r(i)$, and the permutation function may map temporary index j to intermediate index k, or $k=σ(j)$. In another design that is not described below, the permutation function may be followed by the re-mapping function. In this design, the permutation function may map VRB index i to temporary index j, and the re-mapping function may map temporary index j to intermediate index k.

In one design, the re-mapping function r( ) may map input indices to output indices to obtain certain desired characteristics. The re-mapping function may map an input index i to two different output indices j in two slots of a subframe to obtain second order diversity when one VRB is allocated. The re-mapping function may map two input indices i to four different output indices j in two slots of a subframe to obtain fourth order diversity when two VRBs are allocated. In one design, the re-mapping function may be complementary or symmetric, so that $j=r(i)$ for the first slot and $j=r(N_p-i-1)$ for the second slot. In this design, the mapping of smallest to largest input indices i to output indices j in the first slot matches the mapping of largest to smallest input indices i to output indices j in the second slot.

Table 2 shows a design of the re-mapping function for one RBG subset. In the first slot, the re-mapping function may map input index $i=0$ to output index $j=0$, input index $N_p-1$ to output index 1, input index 1 to output index 2, input index $N_p-2$ to output index 3, and so on. In the second slot, the re-mapping function may map input index $i=N_p-1$ to output index $j=0$, input index 0 to output index 1, input index $N_p-2$ to output index 2, input index 1 to output index 3, and so on. As shown in Table 2, a given VRB may be mapped to two PRBs in an RBG subset in two slots and may then achieve second order diversity. A pair of VRBs may be mapped to four different PRBs in an RBG subset in two slots and may then achieve fourth order diversity. For example, VRBs 0 and 1 may be mapped to four different PRBs σ(0), σ(1), σ(2) and σ(3) in two slots.

TABLE 2

Re-mapping Function

| First Slot | | | Second Slot | | |
|---|---|---|---|---|---|
| VRB Index i | Temporary Index j | Intermediate Index k | VRB Index i | Temporary Index j | Intermediate Index k |
| 0 | 0 | σ(0) | 0 | 1 | σ(1) |
| 1 | 2 | σ(2) | 1 | 3 | σ(3) |
| 2 | 4 | σ(4) | 2 | 5 | σ(5) |
| . | . | . | . | . | . |
| . | . | . | . | . | . |
| . | . | . | . | . | . |
| $N_p-3$ | 5 | σ(5) | $N_p-3$ | 4 | σ(4) |
| $N_p-2$ | 3 | σ(3) | $N_p-2$ | 2 | σ(2) |
| $N_p-1$ | 1 | σ(1) | $N_p-1$ | 0 | σ(0) |

As shown in Table 2, the re-mapping function may map indices in complementary order for the first and second slots. This may result in a natural pairing of indices (and hence PRBs) for two slots and may preserve as much PRBs as possible for resource allocation type 0. In one design, VRB allocation may be performed by allocating a set of contiguous VRBs from the top, then from the bottom, then from the top, and so on, moving from the two ends toward the middle. For example, a first UE may be allocated VRBs 0 and 1 and may use PRBs σ(0) and σ(2) in the first slot and PRBs σ(2) and σ(3) in the second slots. A second UE may be allocated VRBs $N_p-2$ and $N_p-1$ and may use PRBs σ(1) and σ(3) in the first slot and PRBs σ(0) and σ(2) in the second slots. These two UEs may each achieve fourth order diversity using four PRBs σ(0), σ(1), σ(2) and σ(3) in two slots. The remaining PRBs may be allocated to other UEs using any resource allocation type. Allocation of VRBs from the two ends and gradually moving toward the middle, using the re-mapping function shown in Table 2, may efficiently conserve PRBs. The re-mapping function may also map input indices i to output indices j in other manners.

In one design, the permutation function σ( ) may be based on a bit-reversed row-column interleaver. For the interleaver, a table with C column and R rows may be defined, where C may be dependent on the system bandwidth and may be defined as shown in Table 3.

TABLE 3

Number of Columns Versus System Bandwidth

| System Bandwidth ($N_{RB}$) | Number of Columns (C) |
|---|---|
| ≤63 | 4 |
| 64-110 | 8 |

The number of rows (R) may be computed based on the number of columns (C), as follows:

$$R=\lceil N_p/C \rceil.\qquad\text{Eq (2)}$$

The operation of the bit-reversed row-column interleaver may be as follows:
1. Create a rectangular table of R rows and C columns.
2. Write numbers i=0 to $N_p-1$ sequentially column-wise from top to bottom and from left to right. Insert filler elements in $R \cdot C-N_p$ locations in the last row of the table, e.g., starting from the right.
3. Perform bit-reversed interleaving of the C columns. The C columns may be assigned indices 0 to C−1. The index of each column may have a binary representation of $[b_0 b_1 \ldots b_c]$, where $b_j$ denotes the j-th bit of the column index. A column with index $[b_0 b_1 \ldots b_c]$ may be swapped with a column with index $[b_c \ldots b_1 b_0]$.
4. Read out the elements of the table sequentially row-wise from left to right and from top to bottom. Skip any filler elements.

The sequence of elements read from the table may be denoted as σ(0), σ(1), σ(2), . . . , σ($N_p-1$). These elements represent temporary indices to which the VRB indices are mapped. In particular, the i-th index written to the table is mapped to the i-th element read from the table, so that VRB index i is mapped to intermediate index σ(i). Since elements σ(i), σ(i+1), σ(i+2) and σ(i+3) are consecutively read from the table, fourth order diversity may be achieved for an allocation of two contiguous VRBs.

For the example shown in FIG. 4 with 18 VRBs for one RBG subset, a table with five rows and four columns may be defined. Numbers 0 to 4 may be written from top to bottom in column 0, numbers 5 to 9 may be written in column 1, numbers 10 to 13 may be written in column 2, and numbers 14 to 17 may be written in column 3, as shown in the first four columns of Table 4. Columns 1 and 2 may be swapped due to bit-reversed interleaving, and the table after column permutation may be as shown in the last four columns of Table 4. The 18 elements of the table may be read out row-wise from left to right and from top to bottom to obtain a sequence of 0, 10, 5, 14, 1, 11, 6, 15, 2, 12, 7, 16, 3, 13, 8, 17, 4 and 9 for σ(0) to σ(17).

TABLE 4

Bit-Reversed Row-Column Interleaver

| Row | Column | | | | Column | | | |
| | 0 | 1 | 2 | 3 | 0 | 1 | 2 | 3 |
|---|---|---|---|---|---|---|---|---|
| 0 | 0 | 5 | 10 | 14 | 0 | 10 | 5 | 14 |
| 1 | 1 | 6 | 11 | 15 | 1 | 11 | 6 | 15 |
| 2 | 2 | 7 | 12 | 16 | 2 | 12 | 7 | 16 |
| 3 | 3 | 8 | 13 | 17 | 3 | 13 | 8 | 17 |
| 4 | 4 | 9 | | | 4 | | 9 | |

Table 5 shows an example of the first mapping function k=f(i) for 18 VRBs in one RBG subset for the first slot. The first mapping function comprises the re-mapping function j=r(i) and the permutation function k=σ(j). Temporary index j in the second and fifth columns of Table 5 may be obtained by applying the re-mapping function shown in Table 2 on VRB index i. Intermediate index k in the third and last columns of Table 5 may be obtained by applying the permutation function described above on temporary index j.

TABLE 5

VRB-to-PRB Mapping for One RBG Subset

| VRB Index i | Temporary Index j | Intermediate Index k |
|---|---|---|
| 0 | 0 | 0 |
| 1 | 2 | 5 |
| 2 | 4 | 1 |
| 3 | 6 | 6 |
| 4 | 8 | 2 |
| 5 | 10 | 7 |
| 6 | 12 | 3 |
| 7 | 14 | 8 |
| 8 | 16 | 4 |
| 9 | 17 | 9 |
| 10 | 15 | 17 |
| 11 | 13 | 13 |
| 12 | 11 | 16 |
| 13 | 9 | 12 |
| 14 | 7 | 15 |
| 15 | 5 | 11 |
| 16 | 3 | 14 |
| 17 | 1 | 10 |

Table 5 shows one design of the re-mapping function and one design of the permutation function for a specific case with 18 VRBs. The re-mapping function may also be implemented in other manners. For example, the re-mapping function may map input indices 0, 1, 2, 3, etc., to output indices 0, $N_p/2$, 1, $N_p/2+1$, etc. in the first slot and to output indices $N_p/4$, $3N_p/4$, $N_p/4+1$, $3N_p/4+1$, etc. in the second slot. The re-mapping function may also map input indices to output indices in other manners.

The permutation function may be implemented with a bit-reversed row-column interleaver, as described above. In general, the table used for the bit-reversed row-column interleaver may include any number of columns that is a power of two and any number of rows. The permutation function may also be implemented with a bit-reversed interleaver, a pseudo-random interleaver, or some other permutation function that maps consecutive input indices to non-consecutive (i.e., permuted) output indices.

Figure 5:
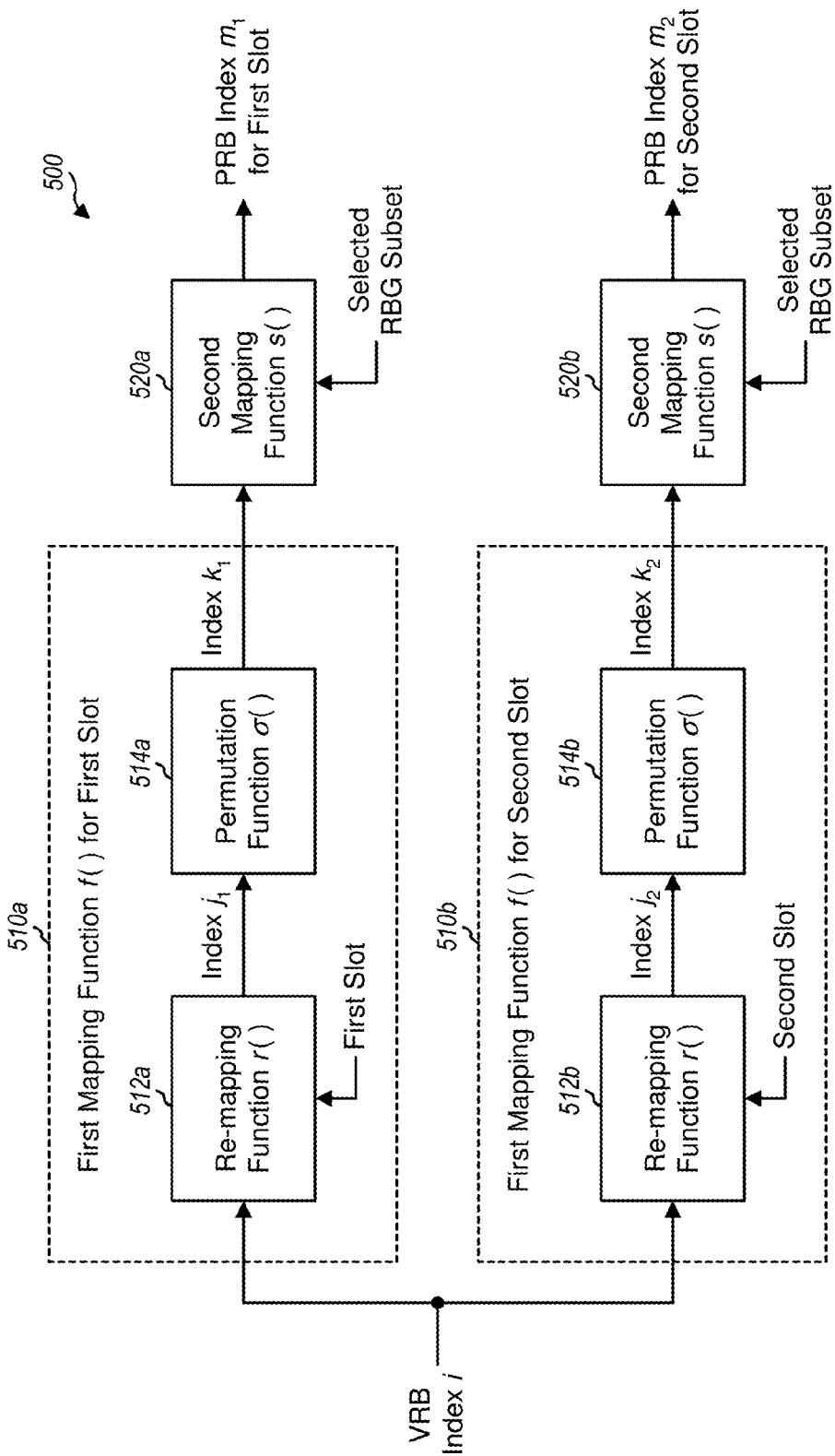
FIG. 5 shows a block diagram of a VRB-to-PRB mapping unit.

FIG. 5 shows a block diagram of a design of a VRB-to-PRB mapping unit 500. A VRB index i for a VRB allocated to a UE may be provided to both (i) a block 510a for the first mapping function f( ) for the first slot of a subframe and (ii) a block 510b for the first mapping function for the second slot of the subframe.

Within block 510a, a block 512a may implement the re-mapping function r( ) for the first slot and may receive VRB index i and provide temporary index $j_1$ for the first slot. A block 514a may implement the permutation function σ( ) and may receive temporary index $j_1$ and provide intermediate index $k_1$ for the first slot. A block 520a may implement the second mapping function s( ) and may receive intermediate index $k_1$ and provide PRB index $m_1$ for the first slot.

Within block 510b, a block 512b may implement the re-mapping function for the second slot and may receive VRB index i and provide temporary index $j_2$ for the second slot. A block 514b may implement the permutation function and may receive temporary index $j_2$ and provide intermediate index $k_2$ for the second slot. A block 520b may implement the second mapping function and may receive intermediate index $k_2$ and provide PRB index $m_2$ for the second slot.

The re-mapping function may map contiguous VRB indices to temporary indices in a complementary manner for the first and second slots, e.g., as shown in Table 2. The same permutation function and the same second mapping function may be used for both the first and second slots. The permutation function may be implemented with the bit-reversed row-column interleaver, as described above, or with some other design. The second mapping function may be dependent on the selected RBG subset, as described above.

The mapping techniques described herein may provide certain advantages. First, the permutation function may provide diversity while keeping allocation for a given UE to the same RBG subset. This may allow each RBG subset to be used for any resource allocation type and may further allow for mixing of different resource allocation types for different RBG subsets. Second, the re-mapping function may ensure pairing of PRBs in the two slots of a subframe. The re-mapping function and the permutation function may operate on indices with a range of 0 to $N_p-1$ (instead of 0 to $N_{RB}-1$), which may simplify the design of these functions. The second mapping function may map PRBs in one RBG subset to available PRBs and may be easily implemented.

Figures 6, 7:
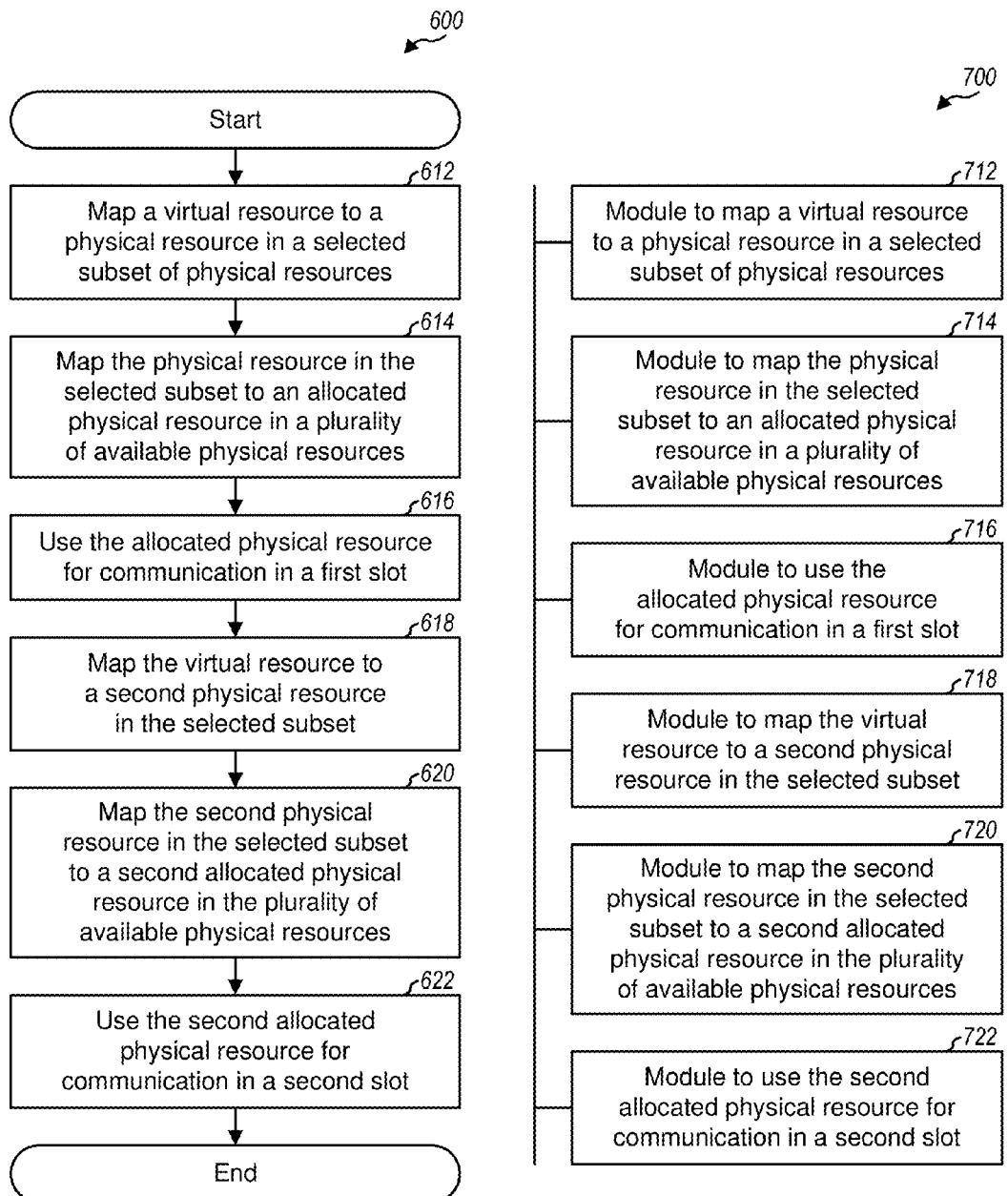
FIG. 6 shows a process for mapping virtual resources to physical resources.
FIG. 7 shows an apparatus for mapping virtual resources to physical resources.

FIG. 6 shows a design of a process 600 for mapping virtual resources to physical resources. Process 600 may be performed by a UE, an eNB/base station, or some other entity. A virtual resource may be mapped to a physical resource in a selected subset of physical resources (block 612). The selected subset may be one of multiple subsets of physical resources formed with a plurality of available physical resources. Contiguous virtual resources may be mapped to non-contiguous physical resources in the selected subset. The physical resource in the selected subset may be mapped to an allocated physical resource among the plurality of available physical resources (block 614). The allocated physical resource may be used for communication (e.g., to send or receive data) in a first slot (block 616).

The virtual resource may also be mapped to a second physical resource in the selected subset (block 618). The second physical resource in the selected subset may be mapped to a second allocated physical resource among the plurality of available physical resources (block 620). The second allocated physical resource may be used for communication in a second slot (block 622).

In one design, K virtual resources may be mapped to K physical resources in the selected subset based on a first mapping function. The K physical resources in the selected subset may be mapped to N available physical resources based on a second mapping function. K may be greater than one and may correspond to $N_p$ above. N may be greater than K and may correspond to $N_{RB}$ above.

In one design of the first mapping function, an index of the virtual resource may be mapped to a temporary index based on a re-mapping function. The temporary index may be mapped to an index of the physical resource in the selected subset based on a permutation function. The order of the re-mapping function and the permutation function may also be swapped.

In one design, the re-mapping function may map the smallest to largest input indices to output indices based on a predetermined mapping in the first slot. The re-mapping function may map the largest to smallest input indices to output indices based on the predetermined mapping in the second slot. The re-mapping function may map an input index to two different output indices for the first and second slots to achieve second order diversity when one virtual resource is allocated. The re-mapping function may also map two consecutive input indices to four different output indices in the first and second slots to achieve fourth order diversity when two virtual resources are allocated.

In one design, the permutation function may map consecutive input indices to permuted output indices to achieve diversity. The permutation function may comprise a bit-reversed row-column interleaver or some other function.

In one design, the second mapping function may map physical resources in the selected subset to the plurality of available physical resources and may be applicable for the selected subset. Different second mapping functions may be applicable for different subsets of physical resources.

In one design, the virtual resource may comprise a VRB, and the allocated physical resource may comprise a PRB. The virtual resource and the allocated physical resource may also comprise other types of resources. In one design, the plurality of available physical resources may be partitioned into multiple groups, with each group including up to P contiguous physical resources, e.g., as shown in FIG. 3A. P may be one or greater and may be dependent on the number of available physical resources. P subsets of physical resources may be formed, with each subset including every P-th group starting with an initial group for the subset. The multiple subsets of physical resources may also be formed in other manners.

In one design, a set of virtual resources may be associated with the selected subset of physical resources. Virtual resources in the set may be allocated to users or UEs by alternating between two ends of the set and moving from the two ends toward the middle of the set.

In one design, the physical resources in each subset may be allocated to users based on at least one resource allocation type. The at least one resource allocation type may include (i) a first resource allocation type (type 0) used to allocate one or more groups of physical resources in a subset of physical resources, (ii) a second resource allocation type (type 1) used to allocate one or more physical resources in a subset of physical resources, and/or (iii) a third resource allocation type (type 2) used to allocate contiguous virtual resources mapped to non-contiguous physical resources in a subset of physical resources. The physical resources in each subset may also be allocated to users in other manners.

FIG. 7 shows a design of an apparatus 700 for mapping resources. Apparatus 700 includes a module 712 to map a virtual resource to a physical resource in a selected subset of physical resources for a first slot, a module 714 to map the physical resource in the selected subset to an allocated physical resource among a plurality of available physical resources for the first slot, a module 716 to use the allocated physical resource for communication in the first slot, a module 718 to map the virtual resource to a second physical resource in the selected subset for a second slot, a module 720 to map the second physical resource in the selected subset to a second allocated physical resource among the plurality of available physical resources for the second slot, and a module 722 to use the second allocated physical resource for communication in the second slot.

The modules in FIG. 7 may comprise processors, electronics devices, hardware devices, electronics components, logical circuits, memories, software codes, firmware codes, etc., or any combination thereof.

Figure 8:
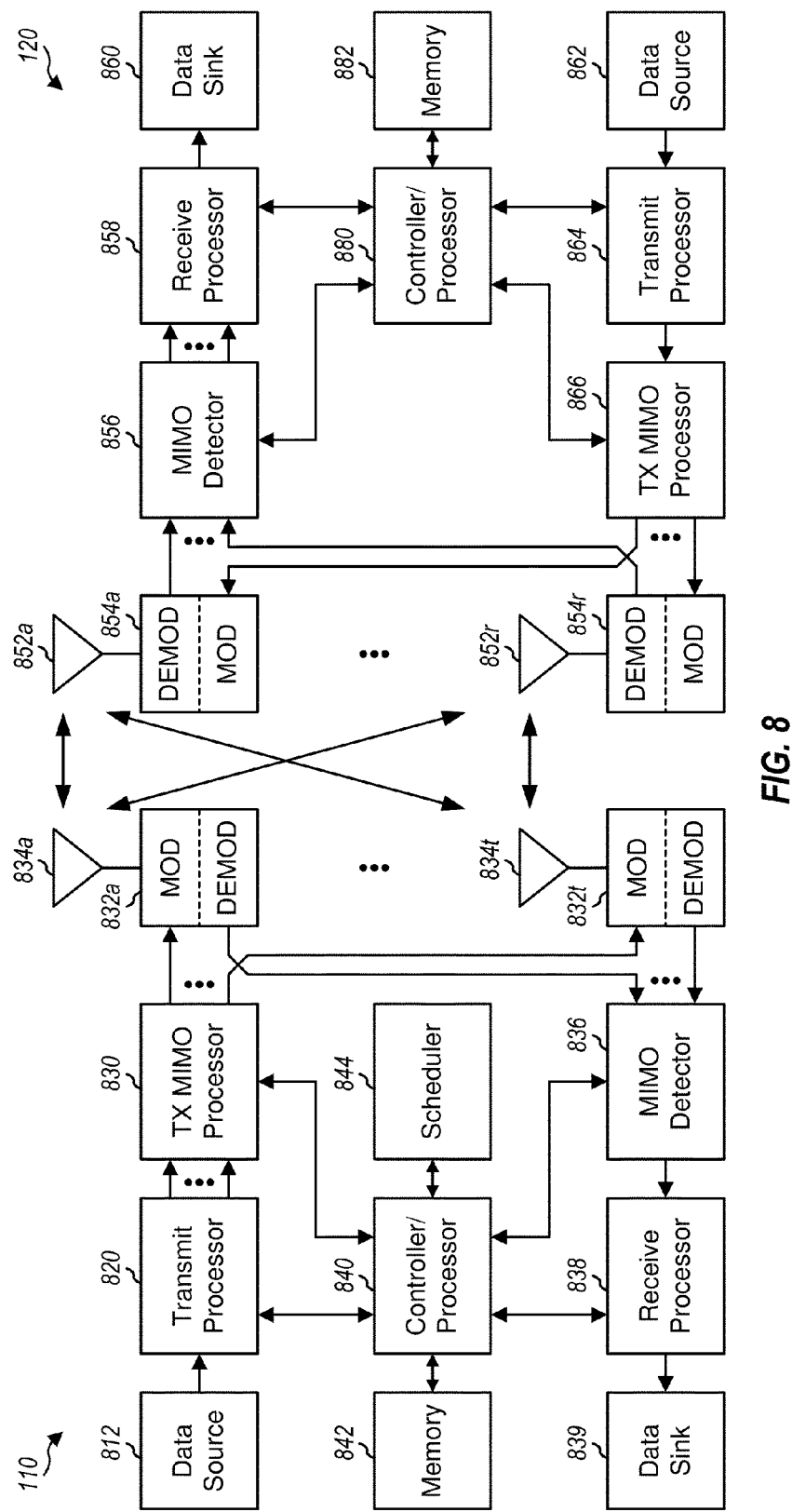
FIG. 8 shows a block diagram of a base station and a UE.

FIG. 8 shows a block diagram of a design of an eNB/base station 110 and a UE 120, which may be one of the eNBs and one of the UEs in FIG. 1. eNB 110 may be equipped with T antennas 834a through 834t, and UE 120 may be equipped with R antennas 852a through 852r, where in general T≥1 and R≥1.

At eNB 110, a transmit processor 820 may receive data for one or more UEs from a data source 812, process (e.g., encode, interleave, and modulate) the data for each UE based on one or more modulation and coding schemes for that UE, and provide data symbols for all UEs. Transmit processor 820 may also process control information (e.g., scheduling information for allocated resources) from a controller/processor 840 and provide control symbols. A transmit (TX) multiple-input multiple-output (MIMO) processor 830 may multiplex the data symbols, the control symbols, and/or pilot symbols. TX MIMO processor 830 may perform spatial processing (e.g., precoding) on the multiplexed symbols, if applicable, and provide T output symbol streams to T modulators (MODs) 832a through 832t. Each modulator 832 may process a respective output symbol stream (e.g., for OFDM) to obtain an output sample stream. Each modulator 832 may further process (e.g., convert to analog, amplify, filter, and upconvert) the output sample stream to obtain a downlink signal. T downlink signals from modulators 832a through 832t may be transmitted via T antennas 834a through 834t, respectively.

At UE 120, antennas 852a through 852r may receive the downlink signals from eNB 110 and provide received signals to demodulators (DEMODs) 854a through 854r, respectively. Each demodulator 854 may condition (e.g., filter, amplify, downconvert, and digitize) a respective received signal to obtain received samples. Each demodulator 854 may further process the received samples (e.g., for OFDM) to obtain received symbols. A MIMO detector 856 may obtain received symbols from all R demodulators 854a through 854r, perform MIMO detection on the received symbols if applicable, and provide detected symbols. A receive processor 858 may process (e.g., demodulate, deinterleave, and decode) the detected symbols, provide decoded control information to a controller/processor 880, and provide decoded data for UE 120 to a data sink 860.

On the uplink, at UE 120, data from a data source 862 and control information from controller/processor 880 may be processed by a transmit processor 864, precoded by a TX MIMO processor 866 if applicable, conditioned by modulators 854a through 854r, and transmitted to eNB 110. At eNB 110, the uplink signals from UE 120 may be received by antennas 834, conditioned by demodulators 832, processed by a MIMO detector 836 if applicable, and further processed by a receive processor 838 to obtain the data and control information transmitted by UE 120.

Controllers/processors 840 and 880 may direct the operation at eNB 110 and UE 120, respectively. Processor 880 and/or other processors and modules at UE 120 may implement the VRB-to-PRB mapping shown in FIGS. 4 and 5 and may perform or direct process 600 in FIG. 6 and/or other processes for the techniques described herein. Processor 840 and/or other processors and modules at eNB 110 may also implement the VRB-to-PRB mapping shown in FIGS. 4 and 5 and may also perform or direct process 600 in FIG. 6 and/or other processes for the techniques described herein. Memories 842 and 882 may store data and program codes for eNB 110 and UE 120, respectively. A scheduler 844 may schedule UEs for downlink and/or uplink transmission and may provide allocations of resources for the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method performed by a wireless communication apparatus, comprising:
   mapping a virtual resource to a physical resource in a selected subset of physical resources by mapping an index of the virtual resource to a temporary index based on a re-mapping function and mapping the temporary index to an index of the physical resource in the selected subset based on a permutation function, wherein the selected subset is one of multiple subsets of physical resources formed with a plurality of available physical resources, wherein the re-mapping function maps two consecutive input indices to four different output indices for first and second slots of a subframe, and wherein contiguous virtual resources are mapped to non-contiguous physical resources in the selected subset;
   mapping the physical resource in the selected subset to an allocated physical resource among the plurality of available physical resources; and
   communicating on the allocated physical resource.

2. The method of claim 1, wherein the permutation function comprises a bit-reversed row-column interleaver.

3. The method of claim 1, wherein the virtual resource comprises a virtual resource block (VRB) and the allocated physical resource comprises a physical resource block (PRB).

4. The method of claim 1, wherein a set of virtual resources is associated with the selected subset of physical resources, the method further comprising:
   allocating virtual resources in the set to users by alternating between two ends of the set and moving from the two ends toward middle of the set.

5. An apparatus for wireless communication, comprising:
   means for mapping a virtual resource to a physical resource in a selected subset of physical resources by mapping an index of the virtual resource to a temporary index based on a re-mapping function and mapping the temporary index to an index of the physical resource in the selected subset based on a permutation function, wherein the selected subset is one of multiple subsets of physical resources formed with a plurality of available physical resources, wherein the re-mapping function maps two consecutive input indices to four different output indices for first and second slots of a subframe, and wherein contiguous virtual resources are mapped to non-contiguous physical resources in the selected subset;
   means for mapping the physical resource in the selected subset to an allocated physical resource among the plurality of available physical resources; and
   means for communicating on the allocated physical resource.

6. The apparatus of claim 5, wherein the permutation function comprises a bit-reversed row-column interleaver.

7. The apparatus of claim 5, wherein the virtual resource comprises a virtual resource block (VRB) and the allocated physical resource comprises a physical resource block (PRB).

8. The apparatus of claim 5, wherein a set of virtual resources is associated with the selected subset of physical resources, the apparatus further comprising:
   means for allocating virtual resources in the set to users by alternating between two ends of the set and moving from the two ends toward middle of the set.

9. A program product for wireless communication, comprising a non-transitory computer readable medium having instructions stored therein for:
   mapping a virtual resource to a physical resource in a selected subset of physical resources by mapping an index of the virtual resource to a temporary index based on a re-mapping function and mapping the temporary index to an index of the physical resource in the selected subset based on a permutation function, wherein the selected subset is one of multiple subsets of physical resources formed with a plurality of available physical resources, wherein the re-mapping function maps two consecutive input indices to four different output indices for first and second slots of a subframe, and wherein contiguous virtual resources are mapped to non-contiguous physical resources in the selected subset;
   mapping the physical resource in the selected subset to an allocated physical resource among the plurality of available physical resources; and
   communicating on the allocated physical resource.

10. The program product of claim 9, wherein the permutation function comprises a bit-reversed row-column interleaver.

11. The program product of claim 9, wherein the virtual resource comprises a virtual resource block (VRB) and the allocated physical resource comprises a physical resource block (PRB).

12. The program product of claim 9, wherein a set of virtual resources is associated with the selected subset of physical resources, the instructions further comprise instructions for:
    allocating virtual resources in the set to users by alternating between two ends of the set and moving from the two ends toward middle of the set.

13. An apparatus for wireless communication, comprising a memory coupled to at least one processor, wherein the at least one processor is configured to:
    map a virtual resource to a physical resource in a selected subset of physical resources by mapping an index of the virtual resource to a temporary index based on a re-mapping function and mapping the temporary index to an index of the physical resource in the selected subset based on a permutation function, wherein the selected subset is one of multiple subsets of physical resources formed with a plurality of available physical resources, wherein the re-mapping function maps two consecutive input indices to four different output indices for first and second slots of a subframe, and wherein contiguous virtual resources are mapped to non-contiguous physical resources in the selected subset;
    map the physical resource in the selected subset to an allocated physical resource among the plurality of available physical resources; and
    communicate on the allocated physical resource.

14. The apparatus of claim 13, wherein the permutation function comprises a bit-reversed row-column interleaver.

15. The apparatus of claim 13, wherein the virtual resource comprises a virtual resource block (VRB) and the allocated physical resource comprises a physical resource block (PRB).

16. The apparatus of claim 13, wherein a set of virtual resources is associated with the selected subset of physical resources, the at least one processor is further configured to:
    allocate virtual resources in the set to users by alternating between two ends of the set and moving from the two ends toward middle of the set.

* * * * *